March 26, 1940.  J. B. VOGES  2,194,991
VEHICLE BODY STRAIGHTENING DEVICE
Filed Dec. 5, 1938   3 Sheets-Sheet 1
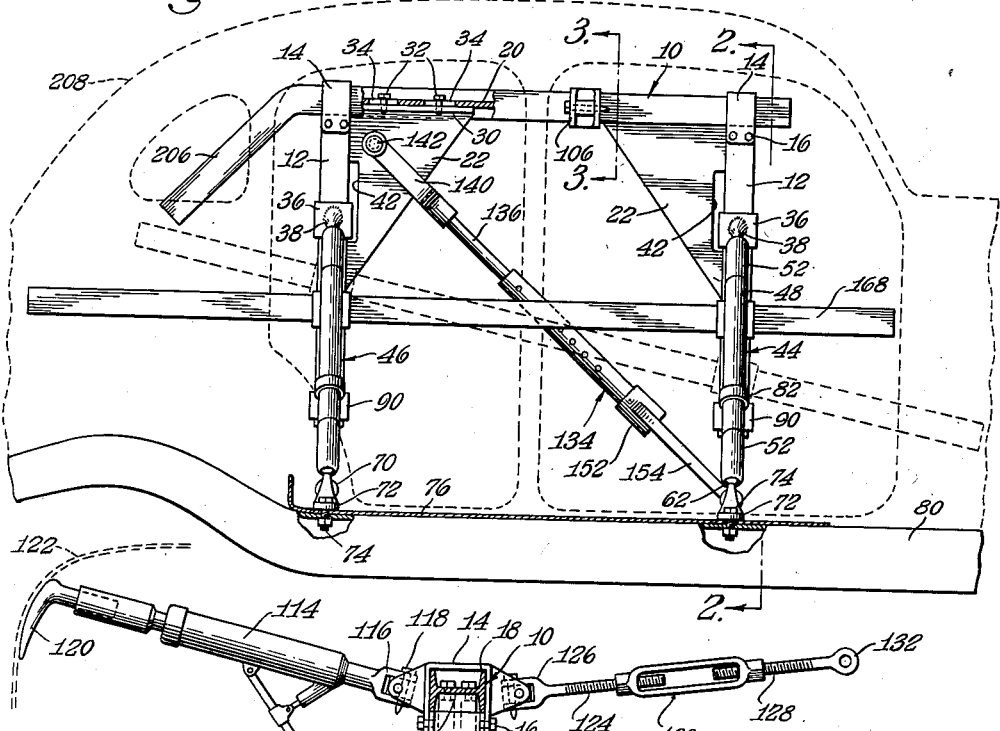
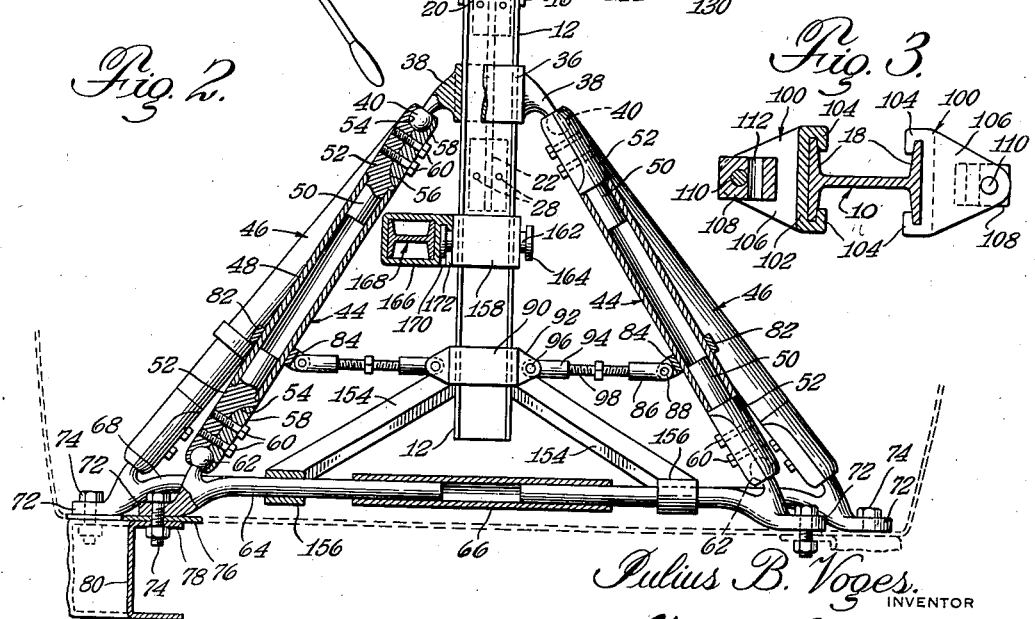
Julius B. Voges, INVENTOR
BY Victor J. Evans & Co.
ATTORNEYS March 26, 1940. J. B. VOGES 2,194,991
VEHICLE BODY STRAIGHTENING DEVICE
Filed Dec. 5, 1938 3 Sheets-Sheet 2
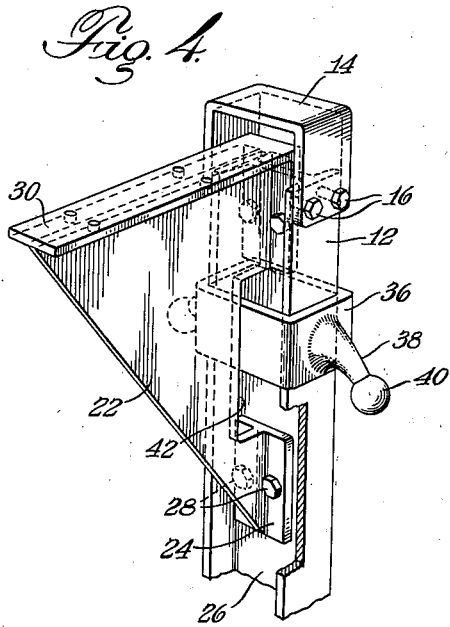
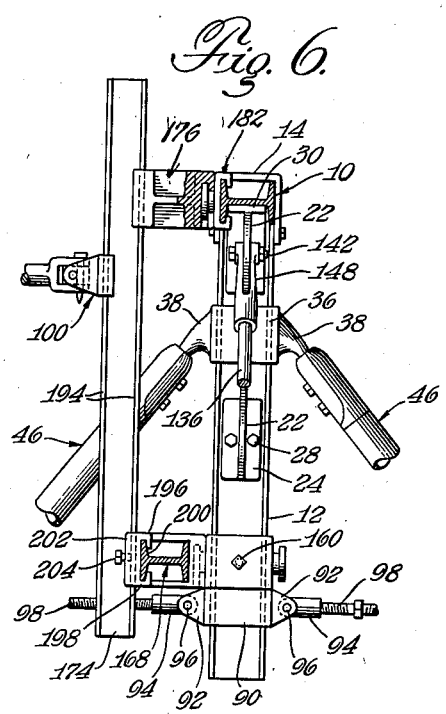
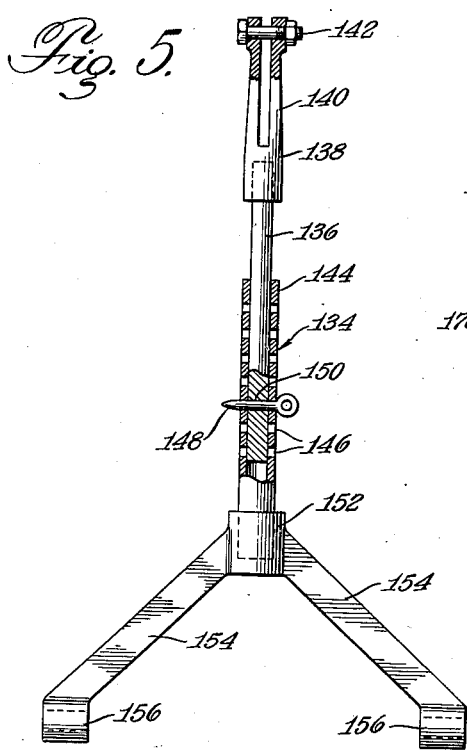
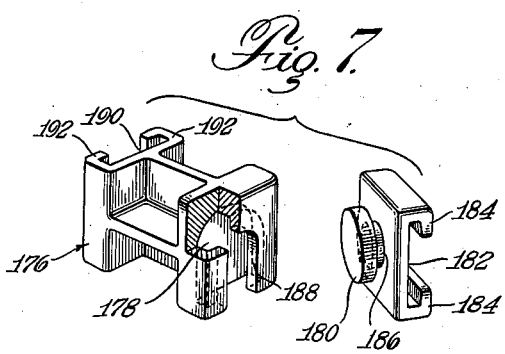
Julius B. Voges.
INVENTOR
BY Victor J. Evans & Co.
ATTORNEYS March 26, 1940.  J. B. VOGES  2,194,991
VEHICLE BODY STRAIGHTENING DEVICE
Filed Dec. 5, 1938  3 Sheets-Sheet 3
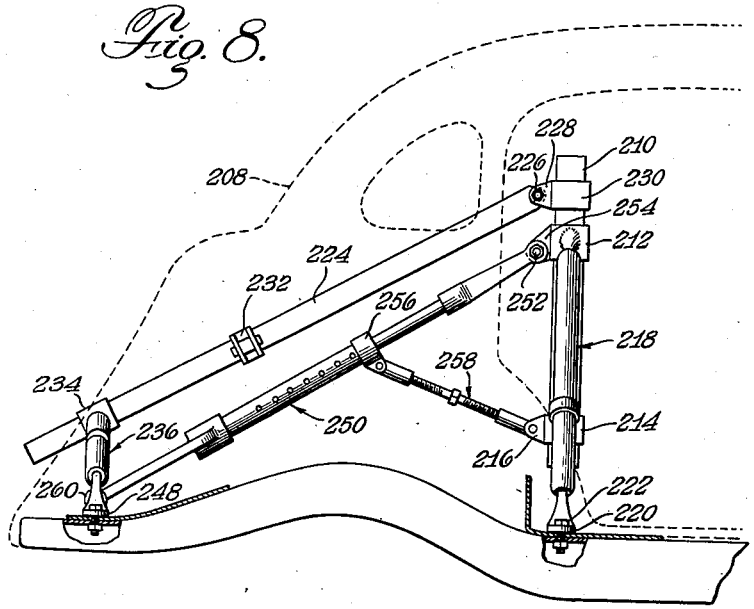
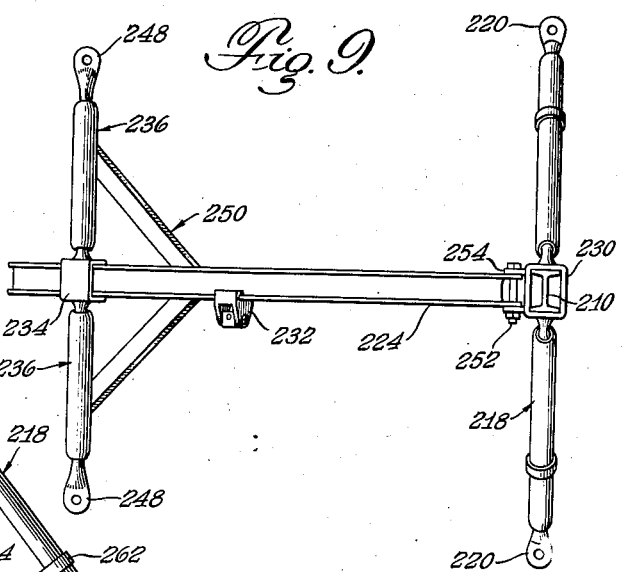
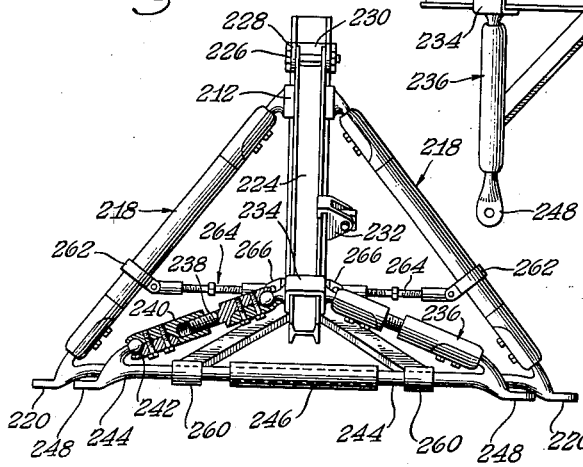
Julius B. Voges,
INVENTOR
BY Victor J. Evans & Co.
ATTORNEYS Patented Mar. 26, 1940

2,194,991

UNITED STATES PATENT OFFICE 2,194,991

VEHICLE BODY STRAIGHTENING DEVICE

Julius B. Voges, Terre Haute, Ind.

Application December 5, 1938, Serial No. 244,091

5 Claims. (Cl. 153—32)

My invention relates to automotive vehicles, and has among its objects and advantages the provision of an improved tool for straightening automobile doors, bodies and the like.

An object of my invention is to provide a device of the type described which is so designed as to facilitate quick and easy mounting of the tool inside the vehicle body and in which the tool embodies a relatively high degree of flexibility as a mount for hydraulic jacks and other instrumentalities to the end that the body may be effectively repaired.

In the accompanying drawings:

Figure 1 is a side view of a chassis frame illustrating my invention applied thereto;

Figure 2 is a view taken from the position indicated by line 2—2 of Figure 1 with certain parts of the tool removed for the purpose of illustration;

Figure 3 is a sectional view along the line 3—3 of Figure 1;

Figure 4 is a perspective view of a portion of the tool with a part removed for the sake of clearness;

Figure 5 is a view illustrating a truss member partly in section;

Figure 6 is a fragmentary view of the tool with certain parts illustrated in section;

Figure 7 is a perspective view of a fitting;

Figure 8 is a side view of the chassis frame illustrating a different type of tool applicable to the rear end of the vehicle body;

Figure 9 is a top plan view of the tool illustrated in Figure 8; and

Figure 10 is an end view with certain parts illustrated in section.

In the embodiment selected to illustrate my invention, I make use of an I-beam 10 which is positioned at the upper ends of vertical I-beams 12. Each I-beam 12 is provided with an inverted U-shaped member 14 fixedly secured thereto by bolts 16. The bights of the members 14 are located sufficiently far beyond the upper ends of the I-beams 12 to accommodate the width of the flanges 18 of the I-beam 10. This I-beam is located with its web 20 positioned horizontally, and the members 14 are slidably related to the I-beam for relative movement longitudinally of the same.

For bracing purposes, each I-beam 12 is interconnected with the I-beam 10 through the medium of a web 22. Fig. 4 illustrates a portion of one I-beam 12 and its associated web 22. Web 22 is provided with a flange 24 positioned adjacent the web 26 of the I-beam and fixedly secured thereto by screws 28. Similarly, the flange 30 is of such width as to lie between the flanges 18 of the I-beam 10 and is fixedly secured to the web 20 by bolts 32, see Fig. 1. This figure illustrates the web 20 as being slotted at 34 for the accommodation of the bolts 32, which bolts are threaded into the flange 30 of the web 22. Thus the I-beam 12 may be shifted longitudinally of the I-beam 10 and secured in predetermined positions of adjustment through the medium of the bolts 32. Both webs 22 are of the same construction.

On each of the I-beams 12 I mount a head 36, each of which includes two shanks 38 provided with spherical bearings 40. Fig. 4 illustrates the head 36 as being rectangular in cross section for embracing the I-beam 12. Web 22 is slotted at 42 for accommodating one wall of the head 36 so as to permit relative movement of the head longitudinally of the I-beam. Heads 36 are identical in construction.

To the spherical bearings 40 of one of the heads 36 I connect truss members 44, see Fig. 2. The spherical bearings 40 associated with the other head 36 are also connected with truss members 46. Members 44 and 46 are identical in construction with the exception that the members 46 are slightly longer. In Fig. 2, each member 44 comprises a tube 48 within each end of which I secure a shank 50 of a connecting member 52. The upper member 52 is recessed at 54 for partly embracing the associated bearing 40. The member is also recessed at 56 for the reception of a companion member 58 recessed in the same manner as the member 52 for cooperation with the bearing 40 to provide a universal joint. Companion member 58 is fixedly connected with the member 52 by bolts 60. The members 52 and 58 associated with the lower end of the tube 48 are connected with a spherical bearing 62 carried by a cross member 64. Each truss rod 44 is connected with one cross member 64, and these cross members are telescopically related to a tube 66. Truss members 46 are also connected with cross members 68 corresponding to the cross members 64 and telescopically related to a tube 70 corresponding to the tube 66.

Figures 1 and 2 illustrate the cross members 64 and 68 as being provided with ears 72 bored for the reception of bolts 74 arranged to pass through openings in the body floor 76 and the flanges 78 of the chassis frame channels 80. In operation, body bolts of the automobile are removed for accommodation of the bolts 74. Fig. 2 illustrates the cross members 64 and 68 as being of slightly different lengths to accommodate the wide and narrow runs of the chassis frame. The device may be attached in the same manner at various positions inside the vehicle body by removing different body bolts.

Fig. 2 illustrates the tubes 48 as being provided with collars 82 provided with lugs 84 to which I pivotally connect threaded sockets 86, as at 88. Fig. 2 illustrates one of the I-beams 12 as being provided with a rectangularly shaped collar 90 which embraces that I-beam and is provided with ears 92 to which I pivotally connect socket members 94, as at 96. Socket members 94 are threaded for connection with screws 98, which screws have threaded connection with the sockets 86 with the threads reversed so that rotation of the screws 98 in one direction will pivot the truss members 44 inwardly of the associated I-beam 12, while rotation in the opposite direction will pivot the two members outwardly. The other I-beam 12 is also provided with a collar 99 which is connected with the members 46 in the same manner as the collar 90 associated with the members 44.

In Figs. 1, 2 and 3 I illustrate the horizontal I-beam 10 as being provided with connecting members 100 to which instruments such as hydraulic jacks and the like may be attached for straightening purposes. Fig. 3 illustrates two members 100 each of which includes a plate 102 lying adjacent one of the flanges 18 and provided with hooks 104 which slidably embrace the outer margins of the flange 18 to permit shifting of the member 100 longitudinally of the I-beam 10. The members 100 are identical in construction and operation. Fig. 1 illustrates one of the members 100, which member includes spaced ears 106 between which I position a connector 108 pivoted upon a shaft 110 carried by the two ears. Connector 108 is provided with a transverse bore 112.

Fig. 2 illustrates a hydraulic jack 114 of conventional construction, which jack includes spaced flanges 116 arranged to be passed over the associated connector 108 and attached thereto by a pin 118 which is slipped through aligned openings in the flanges 116 and the opening 112 in the connector 108 associated with the jack. The hydraulic jack 114 is illustrated as being provided with a removable tool 120 which is arranged in pressure relation with the automobile body 122 for pressing out dents therein. Hydraulic jacks of conventional construction are provided with a series of tools 120 of different configurations so as to permit various types of body dents and distortions to be straightened. Since the hydraulic jack is old and well-known in the art, a detailed description thereof is unnecessary.

It will be noted that the jack may be pivoted about the shaft 110 as an axis so as to permit precise adjustment of the jack for straightening purposes. At the same time, the member 100 associated with the jack may be shifted longitudinally of the I-beam 10 for bringing the jack into the range of the distorted area to be straightened. In some cases body distortions require a pulling force for straightening purposes. Fig. 2 illustrates one of the members 100 as being provided with a screw 124 having flanges 126 corresponding to the flanges 116. A second screw 128 is operatively connected with the screw 124 through the medium of a turnbuckle 130. Screw 128 includes an eye 132 for connection with chains and the like which may be connected with parts to be straightened.

Fig. 1 illustrates a diagonal truss member 134. Referring to Fig. 5, the truss member 134 comprises a shaft 136 to which I connect a member 138 having spaced arms 140 between which the web 22 attached to one of the I-beams 12 is positioned, as illustrated in Figs. 1 and 6. The web 22 is provided with an opening for the reception of the bolt 142 passed through openings in the spaced arms 140. Shaft 136 is slidable inside a tube 144 provided with a series of openings 146 for selectively receiving a pin 148 passing freely through a transverse opening 150 in the shaft 136. Thus the shaft 136 may be shifted inside the tube 144 and latched in different positions depending upon required operating conditions.

The lower end of the tube 144 is pressed into a socket 152 provided with diverging arms 154 provided with eyes 156 for the reception of the members 64, see Fig. 2. Thus one I-beam 12 is interconnected at its upper end with the members 64 associated with the other I-beam below the same. Eyes 156 have loose fits with the members 64 so as to facilitate assembly and detachment for packaging and transportation purposes.

In some cases the connecting members 100 may be insufficient for repairing certain parts of a damaged vehicle body. To this end, I mount a rectangularly shaped collar 158 upon each of the I-beams 12. The collars are adjustable longitudinally of the I-beams and may be secured in different positions through the medium of set screws 160. Fig. 2 illustrates one of the collars 158, which collar is provided with two necks 162 each provided with a head 164. Heads 164 are positioned on opposite sides of the collars 158. The collars 158 associated with the two I-beams 12 are identical in construction, so that the description of one will apply to both.

Fig. 2 illustrates a collar 166 connected with one of the necks 162 for supporting a horizontal I-beam 168. Each collar 158 is connected with one collar 166 for supporting the I-beam 168 in the manner of Fig. 1. Collar 166 is provided with a slot 170 for receiving the associated head 164, and the collar is slotted at 172 for accommodating the associated neck 162, so that collar 166 may be dropped into connected relation with the neck and head. Collars 158 may be adjusted vertically of their respective I-beams 12 so as to support the I-beam 168 at different heights as well as in different angular relations with respect to the horizontal. The collars 166 may be rotated about the necks 162 as axes to permit angular adjustment of the I-beam 168. The set screws 160 will effectively connect the collars 158 with their respective I-beams 12. I-beam 168 may be provided with one or more of the connecting members 100 to the end that the hydraulic jacks and other working instruments might be mounted in lower positions than that illustrated in Fig. 2.

In Fig. 6, I illustrate the manner in which a vertical I-beam 174 may be secured to the horizontal I-beam 168 and the I-beam 10. Fig. 7 illustrates a connector head 176 for supporting the upper end of the I-beam 174. Connector member 176 is provided with a slot 178 for receiving the head 180 on a plate 182 having opposed channels 184 for embracing one of the flanges 18 of the I-beam 10. Channels 184 are slidably related to the flange 18. Head 180 is connected with the plate 182 through the medium of a neck 186, which neck is receivable within a slot 188 in the connector member 176 communicating with the slot 178. Fig. 6 illustrates the plate 182 connected with the I-beam 10 and the vertical I-beam 174 connected with the head. One end of the connector head 176 is provided with a plate 190 terminating in opposed channels 192 for embracing the flange 194 of the I-beam 174.

Fig. 6 illustrates a connector 196 having opposed channels 198 for connection with the flange 200 of the I-beam 168, which member also includes opposed channels 202 for connection with the flange 194 of the I-beam 174. One of the channels 202 is provided with a set screw 204 for fixedly relating the flange 194 to the connecting member 196. Connecting member 196 may be shifted longitudinally of the I-beam 168 which is also true of the plate 182 so that the I-beam 174 may be moved to and fro on the I-beams 10 and 168. Fig. 6 illustrates the I-beam 174 as being provided with one of the connecting members 100. It will thus be seen that a tool may be associated with the connecting member 100 of Fig. 6 and adjusted longitudinally of the I-beam 174 to secure precise location for the tool.

Fig. 1 illustrates the I-beam 10 as being provided with an angular run 206 which conforms generally to the downwardly extending roof area 208 of the automobile body 122. Connecting members 100 may be associated with the angular run 206 in the same manner as with the horizontal run of the I-beam.

It will thus be seen that my invention embodies a tool which may easily be firmly anchored to a frame structure of an automobile for supporting straightening tools. I-beam 10 serves as a mount for tools employed in straightening the roof and upper margins of the side walls. A number of connecting members 100 may be associated with the I-beam 10, and the members may be connected with opposite sides of the I-beam so as to render the tool serviceable for repairing both sides of the automobile body at the same time. In addition, the members 100 are easily adjustable longitudinally of the I-beam so as to secure precise location of the straightening tools which may be associated therewith.

Horizontal I-beam 168 may be adjusted to various angular positions and serves as a mount for connecting members 100 in the same manner as the I-beam 10. I-beam 174 serves as a mount for connecting members 100, and the I-beam may be moved longitudinally of the I-beams 10 and 168 to secure precise location for the connecting members 100. Truss members 44 and 46 are pivotal at their ends, while the members 64 and 68 are adjustably connected with their respective tubes 66 and 70 so as to facilitate adjustment of the ears 72 for accommodating the bolts 74 with respect to the body bolt openings of the vehicle. The I-beam structure, while being easily and quickly adjusted to the required needs of a particular job, is effectively braced so as to provide a sturdy mount for the straightening tools.

In Figs. 8 to 10, I illustrate a slightly different form of my invention. This form includes a vertical I-beam 210 provided with collars 212 and 214 corresponding to the collars 36 and 90, respectively, with the exception that collar 214 includes one set of flanges 216 only. Collar 212 is connected with truss bars 218 in the same manner as the collars 36 are connected with the truss bars 44. Truss bars 218 are of the same construction as the truss bars 44. Figs. 8 and 10 illustrate the truss bars 218 as being provided with ears 220 corresponding to the ears 72 for connection with bolts 222 corresponding to the bolts 74. An I-beam 224 is pivotally connected at 226 with flanges 228 on a collar 230 mounted on the I-beam 210. The I-beam 224 is arranged at an angle to the horizontal so as to be operable within the declining rear end 208 of the vehicle body. This I-beam may be provided with connecting members 232 corresponding to the connecting members 100.

The lower end of the I-beam 224 is provided with a collar 234 corresponding to the collar 212 and connected with truss bars 236 in the same manner. Truss bars 236 are considerably shorter than the truss bars 218. Fig. 10 illustrates the specific construction of the truss bars 236. In the sectioned truss bar, the threaded shank 238 is threaded into a socket 240, which socket corresponds to the parts 52 and 58 of Fig. 2 for connection with the spherical bearing 242 formed on the member 244 telescopically related to the tube 246, which is also telescopically related to the second member 244. Members 244 are provided with ears 248 corresponding to the ears 220. Ears 248 are effective over a shorter span so as to be adaptable to the narrower runs of the chassis frame. A diagonal truss bar 250 of the same construction as the diagonal truss bar 134 is pivotally connected at 252 with a flange 254 formed on the collar 212. A collar 256 is connected with the truss bar 250 and with the flanges 216 through the medium of a screw 258 corresponding to one of the screws 98. The eyes 260 of the truss bar 250 are connected with the members 244. It will thus be seen that the tool of Figs. 8 to 10 may be utilized within a relatively small space and that it provides an I-beam mount for straightening tools in the same manner as the I-beams 10 or 168. Truss bars 218 are each provided with a collar 262 each of which is connected with a screw 264 corresponding to the screw 258. The opposite ends of the screws 264 are connected with the collar 214 through the medium of flanges 266.

The truss member 134 has its upper end connected with the associated plate 22, which plate is bolted to its respective I-beam 12 and the horizontal I-beam 10. Thus the truss member 134 coacts with that plate 22 to support the I-beams 12 from dropping. In view of the fact that most forces incident to straightening of automobile bodies are laterally directed, the truss member 134 affords ample support for the I-beams 12, since little, if any, vertical load is transmitted to the I-beam 10.

Referring to Fig. 1, the slots 42 in the plates 22 provide accommodation for the heads 36 so that the I-beam 10 may be adjusted for height. Truss member 134 may be adjusted to permit the plates 22 to be dropped on to the heads 36 in cases where it is necessary to direct straightening forces vertically. With respect to the I-beam 210, the collars 230 and 214 may be fixedly secured to the I-beam by suitable set screws, such as those indicated at 160 and 204 in Fig. 6.

I claim:

1. An automotive vehicle body repairing device comprising spaced upright members, bracing means connected with the upright members for fixed connection with the vehicle inside the body thereof, a cross member connected with said upright members, a straightening tool mount carried by said cross member, and a tool mounting means adjustably connected with said upright members.

2. An automotive vehicle body repairing device comprising spaced upright members, bracing means connected with the upright members for fixed connection with the vehicle inside the body thereof, a cross member connected with said upright members, a straightening tool mount carried by said cross member, a tool mounting means adjustably connected with said upright members, and a vertical tool mounting means adjustably connected with said cross member and said tool mounting means.

3. An automotive vehicle body repairing device comprising spaced members, bracing means connected with the members for bolted connection with the vehicle inside the body thereof, a cross member connected with said upright members, a straightening tool mounting means adjustably carried by said cross member, a second cross member adjustably related to said members, and a straightening tool mount adjustably carried by the second cross member.

4. An automotive vehicle body repairing device comprising spaced members, bracing means connected with the members for bolted connection with the vehicle inside the body thereof, a cross member connected with said upright members, a straightening tool mounting means adjustably carried by said cross member, a second cross member adjustably related to said members, a straightening tool mount adjustably carried by the second cross member, a vertical member adjustably carried by the first and second cross members, and straightening tool mounting means adjustably carried by said vertical member.

5. An automotive vehicle body repairing device comprising spaced members, bracing means connected with the members for bolted connection with the vehicle inside the body thereof, a cross member connected with said upright members, a straightening tool mounting means adjustably carried by said cross member, a second cross member adjustably related to said members, a straightening tool mount adjustably carried by the second cross member, a vertical member adjustably carried by the first and second cross members, straightening tool mounting means adjustably carried by said vertical member, and bracing means between said members and their respective bracing means.

JULIUS B. VOGES.